Nov. 23, 1965  E. JOSEPHSON  3,219,907
POWER CONVERSION DEVICE
Filed Jan. 8, 1962  2 Sheets-Sheet 1
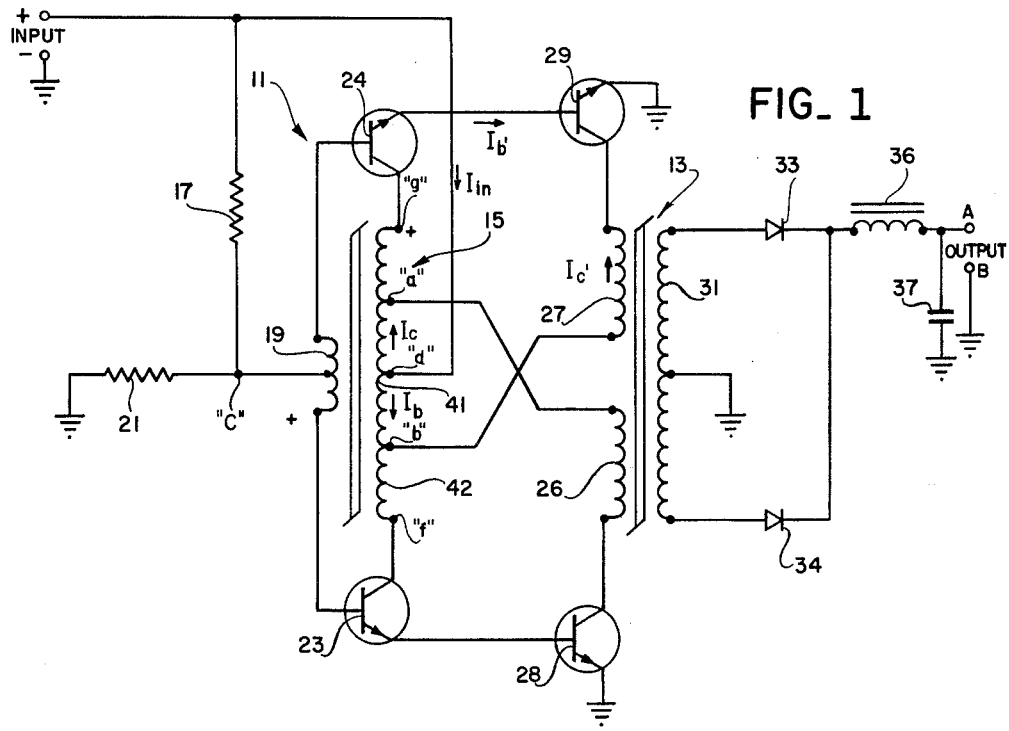
FIG_1
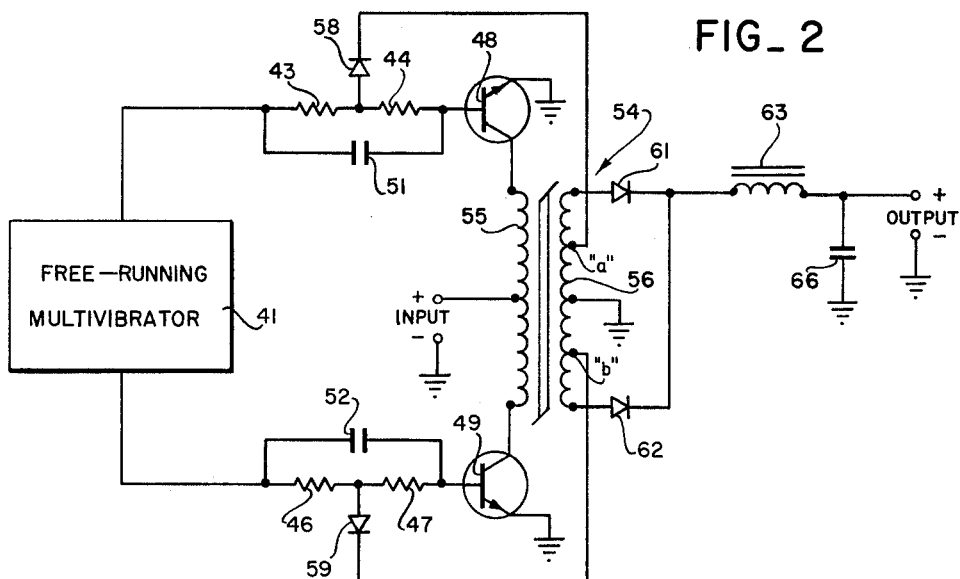
FIG_2
INVENTOR.
ELLIOT JOSEPHSON
BY
George C. Sullivan
Agent

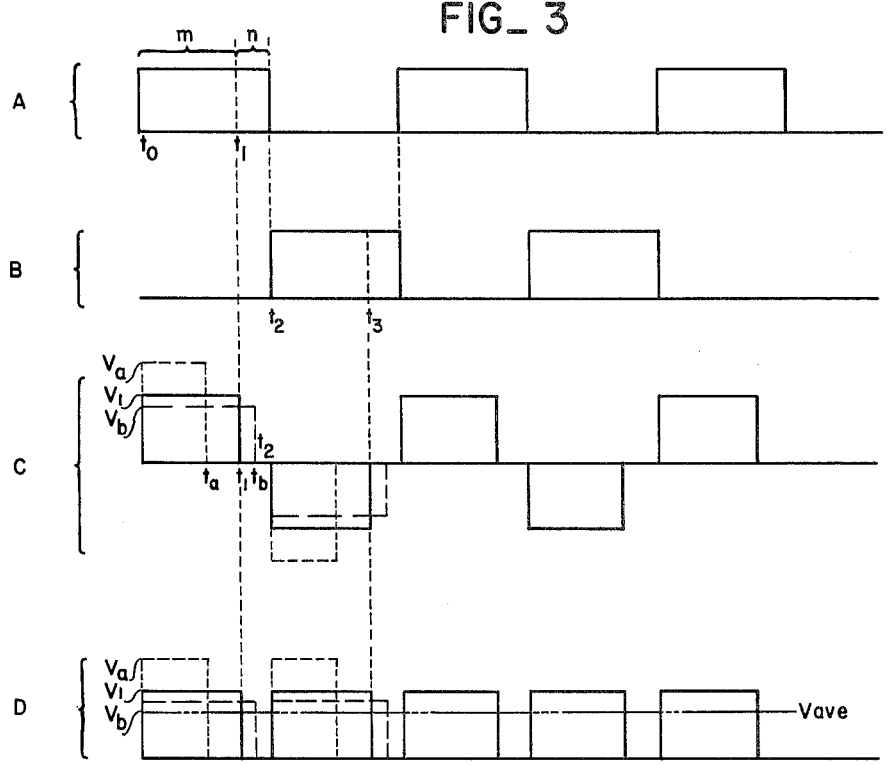
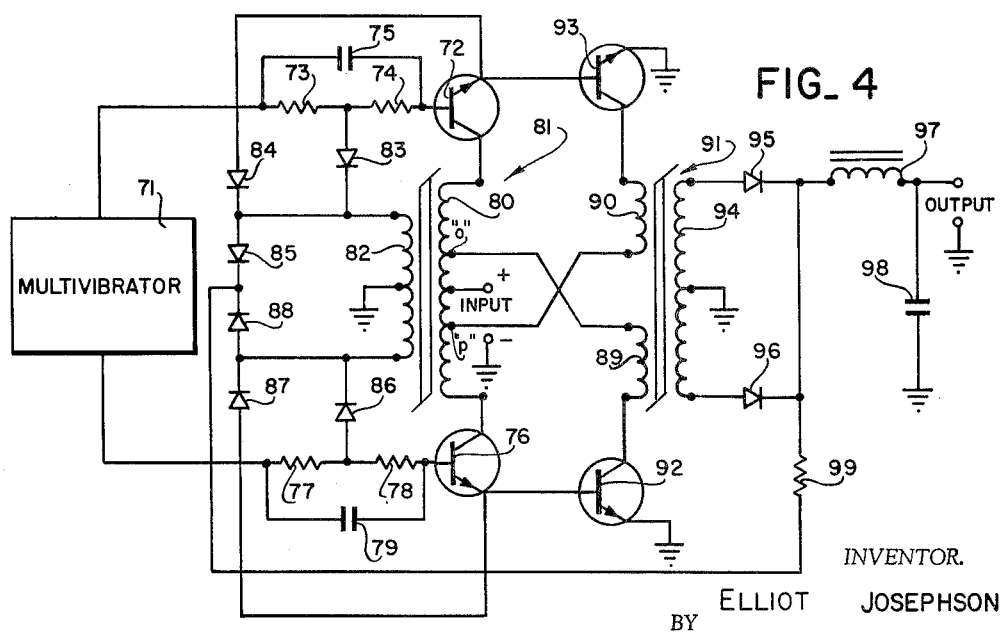
INVENTOR.
ELLIOT JOSEPHSON
BY
George C Sullivan
Agent

United States Patent Office 3,219,907
Patented Nov. 23, 1965

3,219,907
POWER CONVERSION DEVICE
Elliot Josephson, Mountain View, Calif., assignor to Lockheed Aircraft Corporation, Burbank, Calif.
Filed Jan. 8, 1962, Ser. No. 164,850
2 Claims. (Cl. 321—18)

The present invention relates to a power conversion device and more particularly to a highly efficient power conversion device capable of providing a constant voltage output irrespective of varying input voltages.

The conventional method by which constant D.-C. output voltages are obtained with varying D.-C. input voltages is to employ a free-running D.-C. to D.-C. converter in combination with a series regulator. However, a series regulator for a 20 to 30 volt range of D.-C. input voltages, for example, drastically reduces the over-all power supply efficiency and results in generation of excessive heat for many applications.

In one embodiment of the present invention the efficiency of the D.-C. to D.-C. converter is increased by automatic drive regulation that is proportional to load wherein the switching transistors controlling the current to the primary windings of the power transformer operate at a constant saturation beta irrespective of load variations and therefore at optimum efficiency. This is accomplished by driving the base of each transistor by the autotransformer primary winding sections of the drive transformer and supplying the collector current of the transistors by the autotransformer secondary winding sections of the drive transformer. With change in load on the secondary of the power transformer, there is a corresponding change of current in the primary of the power transformer which current is also the transistor collector current and the autotransformer secondary current. Since a constant current ratio between the autotransformer secondary and primary windings is always realized (which ratio is selected by the relative number of turns of the secondary and primary windings) the transistor beta (collector to base current ratio) will always remain constant irrespective of load.

In another embodiment of the present invention the efficiency of the D.-C. to D.-C. converter is increased by employing a square loop core transformer, having the characteristic of the product of the applied voltage and the switching time to saturation being constant. This characteristic is employed to regulate the output voltage by triggering at a constant frequency lower than the free-running frequency rather than being permitted to free-run as in conventional converters. Control is accomplished by the unique use of diodes and a back bias technique which shunts the base drive current of the switching transistors when the transformer reaches saturation.

In still another embodiment of the present invention, the above-described efficiency increasing techniques are combined to provide an extremely efficient D.-C. to D.-C. converter. The incorporation of a diode-resistor circuit makes this combined circuit possible by permitting starting and dampening of undesired oscillations.

While the primary purpose of the present invention is to provide a D.-C. to D.-C. converter, as will hereinafter become apparent, the unique features of the present invention may be employed to obtain a regulated A.-C. signal from the transformer secondary output.

Accordingly an object of the present invention is to provide an efficient converter.

Another object of the present invention is to provide an efficient D.-C. to D.-C. converter.

Still another object of the present invention is to provide a converter wherein the switching transistors are operated at a constant saturation beta irrespective of load.

Still another object of the present invention is to employ the constant secondary to primary current ratio of an autotransformer to operate the switching transistors of a converter at optimum efficiency irrespective of load.

A further object of the present invention is to provide a converter having a transformer wherein the product of the applied voltage and switching time is constant and varying the time duration of current input to the transformer as a function of applied voltage by shunting the base drive current to the switching transistors in response to transformer saturation thereby maintaining a constant voltage output.

A still further object of the present invention is to provide a diode-resistor circuit to dampen oscillations and to make possible the starting of a converter circuit.

The specific nature of the invention, as well as other objects, uses and advantages thereof, will clearly appear from the following description and from the accompanying drawing in which:

FIGURE 1 is a schematic illustration of one embodiment of the present invention.

FIGURE 2 is a schematic illustration of another embodiment of the present invention.

FIGURE 3 is a diagram used to illustrate the operation of the FIGURE 2 embodiment.

FIGURE 4 is a schematic illustration of still another embodiment of the present invention.

Like numerals designate like elements throughout the figures of the drawing.

In FIGURE 1 is illustrated one embodiment of the D.-C. to D.-C. converter of the present invention which operates in a free-running mode and incorporates automatic drive regulation proportional to load wherein the switching transistors, controlling the current to the primary windings of the power transformer operate at a constant saturation beta ($\beta = i_c/i_b$) irrespective of load variations and therefore at optimum efficiency. The D.-C. to D.-C. converter of FIGURE 1 includes drive transformer 11 and power transformer 13 both of which are preferably of the square loop type.

The D.-C. input signal is applied to the center position of primary winding 15 of drive transformer 11 and through resistor 17 to the center position of secondary winding 19 of drive transformer 11. Resistor 21 is connected between one end of resistor 17 and ground. Opposite ends of secondary winding 19 are respectively connected to the bases of transistors 23 and 24 and the corresponding opposite ends of primary winding 15 are respectively connected to the collectors of transistors 23 and 24. Power transformer 13 includes primary windings 26 and 27 wherein one end of primary winding 26 is connected to point "a" of primary winding 15 and one end of primary winding 27 is connected to point "b" of primary winding 27. The opposite ends of primary windings 26 and 27 are respectively connected to the collectors of transistors 28 and 29. The emitter of transistor 23 is connected to the base of transistor 28 and the emitter of transistor 24 is connected to the base of transistor 29. Secondary winding 31 of power transformer 13 is center tapped to ground and opposite ends thereof are connected to the anodes of diodes 33 and 39. The cathodes of diodes 33 and 34 are connected to one end of choke coil 36 and the other end of choke coil 31 is connected to an output terminal and through capacitor 37 to ground. Diodes 33 and 34 function as a conventional full-wave rectifier and choke coil 36 and capacitor 37 function as a conventional filter the operations of which are well known to those skilled in the art.

Operation

As previously pointed out, the primary purpose and function of this embodiment is to have transistors 28 and 29 operate at optimum efficiency irrespective of output load variations on secondary winding 31 of power transformer 13. When operating in the switching mode, optimum transistor efficiency is realized when the transistor is saturated and minimum base current is employed. That is, employing more base current than is necessary to saturate the transistor is an unnecessary consumption of power. Since the minimum base current to cause saturation for a minimum collector current is not sufficient to maintain the transistor saturated when the collector current increases, it is necessary to increase the base current with increase in collector current since the transistor would otherwise be operating as an amplifier in the unsaturated region which is extremely power consuming. For generally encountered load or collector current ranges, optimum efficiency is nearly realized when the base current is linearly increased with linear increase in collector current such that the base current is at about the minimum value necessary to cause saturation at the corresponding collector current. This is accomplished by the present invention by maintaining $\beta$ constant irrespective of load and selecting the maximum $\beta$ value which still maintains saturation throughout the entire load range.

In order to initiate operation of the converter shown in FIGURE 1, the value of resistors 17 and 21 are selected so that sufficient voltage will appear at point "C" (for example, 2 volts) to drive either of transistors 23 or 24 conducting when the input voltage is initially applied. Since transistors never conduct at exactly the same rate, one of transistors 23 or 24 will conduct more rapidly than the other when the D.-C. input is initially applied. Assuming the input voltage is initially applied and transistor 23 conducts more rapidly than transistor 24, current $I_b$ will pass from center tap, point "d," through the collector-emitter junction of transistor 23, through the base-emitter junction of transistor 28 to ground.

The direction of windings 15 and 19 are selected to have the polarities shown when current $I_b$ has the direction shown. Therefore, the voltage induced in secondary winding 19 by current $I_b$ in primary winding 15 causes transistor 23 to conduct heavily and renders transistor 24 nonconducting. The current $I_b$, which is transmitted through transistor 23, is applied to the base of transistor 28 thereby driving it to a conducting state.

The basic feature of the present invention resides in the utilization of autotransformer action. Primary winding 15 of transformer 11 includes autotransformer secondary winding 41, between points "d" and "a," and autotransformer primary winding 42, between points "d" and "f." The input voltage is applied to point "d" and when transistors 23 and 28 are conducting, current $I_b$ flows in the direction shown in autotransformer primary winding 42. Due to flux coupling between autotransformer primary winding 42 and autotransformer secondary winding 41, current $I_c$ will simultaneously flow in the direction shown. It will also be noted that when point "d" is center tapped and the windings are uniform, that point "g" will be twice the potential of point "d," point "a" will be at a potential between the potential existing at points "d" and "g" (which voltage is established by the turns ratio between the autotransformer primary and secondary windings) and the potential at point "f" will be at about ground since the voltage drops across the collector-emitter junction of transistor 23 and the base-emitter junction of transistor 28 are small. Neglecting small line and winding losses, during corresponding half cycles the voltages at these points will remain constant irrespective of the load connected to the output.

The relationships definitive of current $I_c$ may be expressed as:

$$(1) \qquad I_c = \frac{E_a}{Z}$$

where $I_c$ is the current passing through autotransformer secondary winding 41, primary winding 26 and through the collector-emitter junction of transistor 28 to ground, $E_a$ is the potential at point "a" of transformer 11, and Z is the inductive load due to primary winding 26.

It will be appreciated that the load or current requirement offered by winding 26 is directly dependent upon the load applied across output terminals A and B since the power provided by the primary and secondary winding of a transformer are about equal.

In addition, neglecting the small power consumed by transistors 23 and 24 and the small transformer losses, the input power to the autotransformer must equal the output power from the autotransformer which may be expressed by the relationship:

$$(2) \qquad E_d I_{in} = E_a I_c$$

where $E_a$ and $E_d$ are the potentials at points "a" and "d," respectively, $I_{in}$ represents the input current and $I_c$ represents the load current as well as the collector current of transistor 28.

It can be readily seen that the input current ($I_{in}$) is the algebraic sum of the currents passing through the autotransformer primary and secondary windings which may be expressed by the relationship $$(3) \qquad I_{in} = I_b + I_c$$

where $I_b$ is the current in primary winding 42 and $I_c$ is the current in secondary winding 41.

The ratio of $I_c$ to $I_b$ may be obtained from the simultaneous solution of Equations 2 and 3 and dividing both sides by $I_c$ provides the relationship $$(4) \qquad \frac{I_c}{I_b} = \frac{E_d}{E_a - E_d} = K$$

where K is a constant which does not change as a function of load since the voltages remain virtually constant.

From Equation 1 it can be seen that current $I_c$ changes as a function of load Z. In addition, however, from Equation 4 it can be seen that with change of current $I_c$, current $I_b$ must also change to maintain a constant ratio K. Therefore, irrespective of load changes, the ratio of currents $I_c$ to $I_b$ must remain constant. From FIGURE 1 it can be seen that the secondary current $I_c$ is identical to the collector current of transistor 28 and in like manner the primary current $I_b$ is identical to the base current of transistor 28.

As previously indicated, the saturation $\beta$ of a transistor may be expressed by the relationship:

$$(5) \qquad \beta = \frac{I_c}{I_b}$$

where $I_c$ is the collector current and $I_b$ is the base current. In addition, there exists a particular $\beta$, for a given transistor, at which the transistor operates at optimum efficiency throughout the load range.

It will be particularly noted that Equation 5 (which is definitive of the transistor $\beta$) has identically the same form as Equation 4 (which is definitive of the current ratio of the autotransformer). The ratio $I_c/I_b$ of Equation 4 is selected such that it is equal to the $\beta$ representing the optimum efficiency of transistors 28 and 29. In this manner transistors 28 and 29 are operated at optimum efficiency irrespective of changes in the output load.

The above description relates to one-half cycle of operation and assumes that transistor 23 conducts more rapidly than transistor 24. It will be apparent that when transformer 11 becomes saturated, at the completion of the above-described one-half cycle of operation, that transistor 23 will become nonconducting and transistor 24 will start conducting. When transistor 24 conducts, current $I_c^1$ will flow through primary winding 27 and current $I_b^1$ will provide the base drive for transistor 29. The function and analysis of currents $I_b^1$ and $I_c^1$ are identical to that of currents $I_b$ and $I_c$ as hereinabove described.

In summary, square loop transformer 13 is alternately switched positive and negative, but not to saturation, by means of transistors 28 and 29. These transistors are controlled by the primary current of square loop transformer 11 by means of transistors 23 and 24. Transformer 11 is switched to positive and negative saturation in a free-running mode of operation by means of secondary feedback. It is to be understood, however, that transformer 11 may be operated in a forced mode, rather than in a free mode, as hereinafter explained with relation to the FIGURE 2 embodiment. Transformers 11 and 13 are connected so the primary current in transformer 13 reflects as a load on transformer 11. Since the primary current in a transformer is a direct function of the load, an increase of load on transformer 13 increases the primary current in transformer 13 which increases the load on transformer 11 which in turn increases the primary current in transformer 11. By autotransformer action of the primary of transformer 11, the base drive for transistors 28 and 29 is a direct function of the load on transformer 13, thereby operating transistors 28 and 29 at a constant $\beta$ and at optimum efficiency. It should be particularly noted that if the collectors of transistors 28 and 29 were respectively connected through primary windings 26 and 27 to the center tap (point "$a$") of primary winding 15, that the base of the transistors would be connected in parallel with the load and the currents would be independent of each other and a constant $\beta$ would not be realized.

In FIGURE 2 is another embodiment of the present invention. The outputs of multivibrator 41 are respectively connected through resistors 43 and 44 and resistors 46 and 47 to the bases of transistors 48 and 49. Capacitors 51 and 52, respectively, shunt resistors 43 and 44 and 46 and 47, the function of which will hereinafter be explained. Transformer 54 includes primary winding 55, the opposite ends of which are respectively connected to the collectors of transistors 48 and 49, and secondary winding 56. Secondary winding 56 is center tapped to ground and has intermediate taps, at points "$a$" and "$b$," which are connected through diodes 58 and 59 to the common connections of resistors 43 and 44 and 46 and 47, respectively. Opposite ends of secondary winding 56 are connected through diodes 61 and 62 to one end of choke coil 63 and the other end of choke coil 63 is connected to an output terminal and through capacitor 64 to ground. The D.-C. input to the convertor is applied to the center tap of primary winding 55.

Operation

It should be initially noted that the D.-C. to D.-C. converter of FIGURE 2 is not permitted to free-run as in conventional square loop converters, but rather, it is controlled by a separate frequency source the frequency of which is lower than the free-running frequency.

The operation of this embodiment may be best understood by referring to the curves shown in FIGURE 3. Curves "A" and "B" represent the output pulses from multivibrator 41 which are respectively applied to the bases of transistors 48 and 49. At time $t_0$, the leading edge of the pulse from multivibrator 41 is generated. Since the impedance of capacitor 51 is less than the impedance of the current path through resistor 43, diode 58 and secondary winding 56 to ground, the leading edge of the pulse will be transmitted through capacitor 51 thereby providing sufficient base current to render transistor 48 conducting. As transistor 48 thus becomes conducting, current is passed from the D.-C. input, through the upper half of primary winding 55, through the collector-emitter junction of transistor 48 to ground and thereby inducing a voltage in secondary winding 56. A positive voltage is tapped at point "$a$" of secondary winding 56 and applied to the cathode of diode 58. This positive voltage is selected, by selecting tap point "$a$," to have a value sufficient to prevent diode 58 from conducting when the D.-C. pulse from multivibrator 41 is at maximum value. After transistor 48 is rendered conducting, by the leading edge of the multivibrator pulse passing through capacitor 51, the D.-C. portion of the multivibrator pulse (denoted by bracket "$m$" in curve "A" of FIGURE 3) passes through resistors 43 and 44, through the base-emitter junction of transistor 48 to ground thereby maintaining it in a conducting state. This D.-C. base drive current will continue to follow this path so long as diode 58 is back biased in the above-described manner. However, when transformer 54 becomes saturated, for example at time $t_1$ as depicted in FIGURE 3, the secondary voltage as well as the voltage at point "$a$" on the secondary winding will approach zero. Therefore, diode 58 will be forward biased, since the anode potential is at about the potential of the multivibrator pulse, and the remaining portion of the multivibrator pulse (denoted by the bracketed portion "$n$") is shunted to ground through diode 58 and that section of secondary winding 56 between point "$a$" and the center tap. Since the base drive current for transistor 48 is shunted to ground at time $t_1$, transistor 48 will likewise become nonconducting at time $t_1$. From time $t_1$ to time $t_2$ there is no voltage output from secondary winding 56 since transistors 48 and 49 are nonconducting and no current is passing through the primary winding. At time $t_2$ the leading edge of the pulse from multivibrator 41 (curve B) is transmitted through capacitor 52 which provides sufficient base current to render transistor 49 conducting. Transistor 49 remains conducting until transformer 54 becomes saturated for the reasons explained above for operation during the first half cycle of operation.

Diodes 58 and 59, in addition to functioning in the above-described manner, function to back bias transistors 48 and 49 respectively. Point "$a$" of secondary winding 56 will be negative with respect to ground during that half cycle when transistor 49 is conducting and point "$b$" will be negative during that half cycle when transistor 48 is conducting. Therefore, neglecting the slight drop across diode 59, the base of transistor 49 will be at the negative potential of point "$b$" when transistor 48 is conducting. In like manner the base of transistor 48 is at the negative potential of point "$a$" when transistor 49 is conducting. It has been found that the breakdown voltage of transistors 48 and 49 has been increased by back biasing in this manner and it is therefore possible to employ higher input voltages than would be normally permissible if back biasing were not employed.

It should be particularly noted that the rectified transformer output voltage will remain constant over a wide range of input voltages. This is accomplished since the conduction time of transistors 48 and 49 are automatically adjusted to the required conduction time by virtue of the square loop core transformer having a constant volt-second product characteristic. This constant volt-second product may be expressed by the relationship:

(1) $$Vt = K$$

In order to illustrate this automatic adjustment, assume the input voltage is $V_a$ for one condition and $V_b$ for another condition of operation. Assuming $V_a$ is greater than $V_b (V_a > V_b)$ then (2) $$V_a t_a = V_b t_b = K$$

and (3) $$t_a < t_b$$

where $t_a$ and $t_b$ are the time durations required for transformer saturation where the input voltages are $V_a$ and $V_b$, respectively.

Since these relationships are linear, it will be apparent that the average or filtered voltage output will remain constant irrespective of change in the input voltage. This is illustrated in FIGURE 3, curves C and D, where the dotted lines illustrate an input voltage of $V_a$, the solid lines an input voltage of $V_1$ and the dashed lines an input voltage of $V_b$. By graphical inspection, it can be seen the average voltage, $V_{ave}$, will remain constant irrespective of changes in the input voltage. That is, the volt-second area within the dashed lines (defined by $V_b$ and $t_b$) is equal to the volt-second area within the solid lines (defined by $V_1$ and $t_1$), each of which are equal to the area within the dotted lines (defined by $V_a$ and $t_a$).

In FIGURE 4 is illustrated still another embodiment of the present invention wherein the features of the embodiments of FIGURES 1 and 2 are combined to cooperate in a manner to provide an extremely efficient D.-C. to D.-C. converter. Multivibrator 71 provides a series of output pulses which are respectively applied to the base of transistor 72 through resistors 73, 74 and capacitor 75. Another series of output pulses are provided by multivibrator 71 which are applied to the base of transistor 76 through resistors 77 and 78 and capacitor 79. The D.-C. input power is applied to the center tap of primary winding 80 of drive transformer 81, the opposite ends of which are connected through the collector-emitter junctions of transistors 72 and 76 to the base of transistor 93 and 92 and to the anodes of diodes 84 and 87. Secondary winding 82 is center tapped to ground with the opposite ends thereof connected to diodes 83 through 88 as shown. Primary windings 89 and 90 of power transformer 91 are respectively connected to points "o" and "p" of primary winding 80 and to switching transistors 92 and 93. Secondary winding 94 is connected to diodes 95 and 96, which function as a full wave rectifier, and to choke coil 97 and capacitor 98, which function as a filter, to the output terminal. Resistor 99 interconnects the cathodes of diodes 95 and 96 to the cathodes of diodes 85 and 88 and function in the hereinafter described manner.

*Operation*

It should initially be noted that substantial differences exist between the circuit shown in FIGURE 4 and the circuits shown in FIGURES 1 and 2 when considered together. For example, a power consuming resistive starting circuit, consisting of resistors 17 and 21 in FIGURE 1, is obviated in the FIGURE 4 embodiment. In addition, transistors 72 and 76 are back biased through diodes 85 and 88 by secondary winding 82 of drive transformer 81. Furthermore, a pair of diodes 85 and 88 and resistor 99 are provided to both dampen oscillations and to make starting of the circuit possible.

Operation is initiated by applying D.-C. power to primary winding 80 and obtaining the pulse trains from multivibrator 71. Assuming the first pulse is applied to capacitor 75 and resistors 73 and 74, then transistor 72 will be rendered conducting until transformer 81 becomes saturated, the particular operation of which has been described with relation to the FIGURE 2 embodiment. In order to understand the operation and function of diodes 85 and 88 and resistor 99, it is important to note that voltage spikes are generated in secondary winding 82 when transformer 81 saturates. If these voltage spikes are not dampened, the system will go into oscillation and the voltage amplitude of the oscillations would increase as a function of time thereby eventually resulting in system failure. Therefore, to dampen the voltage spikes, diodes 85 and 88 interconnect the opposite ends of secondary winding 82 to resistor 99 which functions as a load. By referring to curve "D" of FIGURE 3, which is illustrative of the operation of this embodiment as well as the FIGURE 2 embodiment, it can be seen that when transformer 81 saturates (at time $t_1$, for example) that the output of the full wave rectifier is at ground potential. That is, a dead space between rectified pulses exists during the time period between saturation of the drive transformer and the leading edge of the next pulse from the multivibrator. Since the voltage spikes occur at the beginning of this dead space, they are shunted to ground and oscillations are obviated. If diodes 85 and 88 only functioned to shunt the voltage spikes to ground, resistor 99 could be omitted. However, diodes 85 and 88 also shunt the desirable and necessary voltages generated in secondary winding 82. That is, assume the leading edge of the pulse from the multivibrator has initially rendered transistor 72 conducting and a positive voltage is created in the upper half of secondary winding 82. If resistor 99 were not provided, the cathode of diode 83 would not be back biased by this positive potential since diode 85 would provide a direct shunt to ground. Therefore, since diode 83 would not be back biased the remainder of the pulse from multivibrator 71 would be shunted through diode 83 and diode 85 to ground and transistor 72 would return to a nonconducting state prior to transformer 81 becoming saturated. Resistor 99 is therefore employed to maintain the back bias on diode 83 so that transistor 72 will remain conducting until transformer 81 becomes saturated. The value of resistor 99 is selected to have a sufficiently large value so that diodes 83 and 86 will have adequate positive potential to prevent the multivibrator pulse from being shunted and a sufficiently small value so that sufficient current will be passed during the above-mentioned voltage spikes to prevent system oscillations.

Diodes 84 and 87 function to back bias transistors 93 and 92, respectively, during alternate half cycles when they are in the non-conducting state. This is accomplished since the anode of diode 84 is negatively biased by the top end of secondary winding 82 when transistor 92 is conducting and the anode of diode 87 is negatively biased by the bottom end of secondary winding 82 when transistor 93 is conducting. As explained with relation to the FIGURE 2 embodiment, this back biasing of the transistors increases the breakdown voltage thereof and makes it possible to operate with high input voltages.

The specific operation of a complete cycle, taking into account the autotransformer action of transformer 81 and the triggering technique of transistors 72, 76, 92 and 93 will not be described since the operation thereof will be apparent from the description of the embodiments shown in FIGURES 1 and 2.

It is to be understood in connection with this invention that the embodiments shown are only exemplary, and that various modifications can be made on construction and arrangement within the scope of the invention as defined in the appended claims.

What is claimed is:

1. An inverter device comprising a first transformer including an input winding and an output winding, a power source operatively connected to said input winding, a first pair of transistors each having its base operatively connected to an end of said output winding and its collector connected to an end of said input winding, a second transformer including an input winding and an output winding, one end of the input winding of said second transformer operatively connected to the input winding of said first transformer, a second pair of transistors each having its base operatively connected to the emitter of one of said first transistors and each having its emitter operatively connected to ground, a load means operatively connected to the output winding of said second transformer, whereby the ratio of the current supply to the collectors of each transistor from the input winding of said second transformer to the current supply to the base of each transistor from the input winding of said first transformer being substantially constant irrespective of the load applied to the output winding of said second transformer.

2. An inverter device comprising a first transformer including an input winding and an output winding, a power source operatively connected to the center tap of said input winding, a first pair of transistors each having its base operatively connected to the output winding of said first transformer and each having its collector operatively connected to the input winding of said first transformer, a second transformer including an input winding and an output winding, one end of the input winding of said second transformer operatively connected to said input winding of said first transformer at a position displaced from said center tap, a second pair of transistors each having its base operatively connected to the emitter of one of the first pair of transistors, each having its collector operatively connected to the primary winding of said second transformer and each having its emitter operatively connected to ground, a load means operatively connected to the secondary winding of said second transformer whereby the ratio of the current supplied to the collector of each of said first pair of transistors from the input winding of said second transformer to the current supply to the base of each of said transistors from the input winding of said first transformer being substantially constant irrespective of the load applied to the output winding of said second transformer.

References Cited by the Examiner

UNITED STATES PATENTS

| | | | |
|---|---|---|---|
| 2,959,725 | 11/1960 | Younkin | 321—18 |
| 2,987,664 | 6/1961 | Poiries et al. | 321—18 X |
| 3,004,206 | 10/1961 | Sheffet | 321—18 X |
| 3,012,181 | 12/1961 | Schultz | 321—18 X |
| 3,117,270 | 1/1964 | Tailleur | 321—18 X |
| 3,119,056 | 1/1964 | Hatke | 321—18 X |

MILTON O. HIRSHFIELD, *Primary Examiner.*

LLOYD McCOLLUM, RALPH D. BLAKESLEE,
*Examiners.*